United States Patent [19]

Tomka et al.

[11] 4,237,034

[45] Dec. 2, 1980

[54] POLYAMIDE COMPOSITIONS CONTAINING CARBOXYLIC ACID METAL SALT AND ORGANOPHOSPHONIC ACID

[75] Inventors: Jiri Tomka, Harrogate; Jack M. Ginn, St. Albans, both of England

[73] Assignee: Imperial Chemical Industries Limited, London, England

[21] Appl. No.: 683,826

[22] Filed: May 6, 1976

Related U.S. Application Data

[63] Continuation of Ser. No. 463,144, Apr. 22, 1974, abandoned.

[30] Foreign Application Priority Data

May 14, 1973 [GB] United Kingdom ............... 22783/73
Sep. 20, 1973 [GB] United Kingdom ............... 44131/73

[51] Int. Cl.³ ..................... C08L 77/00; C08L 77/02
[52] U.S. Cl. ..................................... 260/18 N; 525/2; 525/4; 525/5
[58] Field of Search .................................. 525/2, 4, 5

[56] References Cited

U.S. PATENT DOCUMENTS

| | | | |
|---|---|---|---|
| 2,927,841 | 3/1960 | Ben ................................. | 260/78 SC |
| 3,080,345 | 3/1963 | Brooks et al. ...................... | 260/78 S |
| 3,224,987 | 12/1965 | Kessler ............................. | 260/18 N |
| 3,228,898 | 1/1966 | Illing et al. ....................... | 260/18 N |
| 3,235,534 | 2/1966 | Brinkman et al. .................. | 260/78 S |
| 3,509,107 | 4/1970 | Brignac ............................ | 260/78 SC |
| 3,551,548 | 12/1970 | Brignac et al. ................... | 260/78 SC |
| 3,755,221 | 8/1973 | Hitch ............................... | 260/18 N |
| 3,763,113 | 10/1973 | Burrows et al. ................... | 260/78 SC |
| 3,835,101 | 9/1974 | Oswald et al. .................... | 260/78 SC |
| 3,872,055 | 3/1975 | Furukawa et al. ................. | 260/45.7 P |

FOREIGN PATENT DOCUMENTS

889403 2/1962 United Kingdom.
928286 6/1963 United Kingdom.
1208865 10/1970 United Kingdom.

*Primary Examiner*—Harold D. Anderson
*Attorney, Agent, or Firm*—Cushman, Darby & Cushman

[57] ABSTRACT

Method for producing improved nucleating agent systems for polyamides comprising intimately blending a combination of a metal salt of saturated or unsaturated carboxylic acids or a metal oxide or a metal hydroxide and an organophosphonic acid with a polyamide under melt conditions.

21 Claims, No Drawings

POLYAMIDE COMPOSITIONS CONTAINING CARBOXYLIC ACID METAL SALT AND ORGANOPHOSPHONIC ACID

This is a continuation of application Ser. No. 463,144 filed Apr. 22, 1974, now abandoned.

The present invention relates to nucleated polyamides exhibiting an increased rate of crystallisation and to processes for the preparation thereof.

It is known to employ nucleating agents to improve the properties of moulded polyamides, in particular by imparting a fine-grained uniform structure resulting in the article being substantially stress-free. In addition, due to the increased rate of crystallisation, nucleating agents substantially shorten the injection moulding cycle time, thus increasing productivity.

Some nucleated polyamides, e.g. 66 nylon, exhibit improved productivity when spun into fibres compared with the unnucleated polyamide as described in British Pat. No. 1,211,685.

In the processes for the preparation of such nucleated polyamides finely divided solid materials which give a nuclei-forming effect are added to the polyamide and uniformly dispersed therethrough.

British Pat. No. 851,300 discloses, as nucleating agents, materials such as graphite, molybdenun disulphide, cobalt and ferrous sulphides, tungsten sulphide, Scheelite, alkali metal halides such as lithium fluoride and silicic acid, in amounts ranging from 0.001 to 0.1% by weight.

British Pat. No. 889,403 describes the use of 0.1 to 1% by weight of the metal salt of a saturated or unsaturated fatty acid to induce nucleation. The metal may be calcium, magnesium, zinc, lithium, sodium, potassium, cadmium, aluminium or lead and the fatty acids stearic, oleic or palmitic acids. The use of these materials may be employed not only with polyamides but also with polyurethane or polyethylene polymers. It has now been found that metal salts such as salts of carboxylic acids give an improved nucleating effect when used in combination with organo-phosphonic acids.

According to the invention there is provided a method of producing a polyamide composition comprising intimately blending (1) an organo-phosphonic acid of general formula

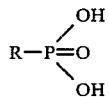

where R is an organic radical and (2) a metal compound selected from metal salts of saturated or unsaturated carboxylic acids, metal oxides or hydroxides, with a polyamide under melt conditions.

The compositions produced by such a method shows a rapid crystallisation rate enabling, for example, an increased rate of production of polyamide articles moulded from the composition to be obtained.

The term "organo-phosphonic acid" as used herein includes any derivative of said acid which under the reaction conditions involved during the melt blending process will react with the metal compound to produce the same effect as the free acid.

The desired blending may be achieved by a variety of methods. For example, the specified metal salts, oxides or hydroxides may be introduced into molten polyamides containing the organo-phosphonic acid. Alternatively, the organo-phosphonic acid can be incorporated into molten polymer already containing the source of metal, or both components can be incorporated simultaneously into molten polyamide.

Whatever blending process is used it is necessary that the metal compound and the organo-phosphorus compound are mixed together in the polyamide when it is in a molten state, for example during melt extrusion of the polyamide from an extruder. If both the types of compound are brought together during the polymerisation of the polyamide while the reactants are present in solution form the beneficial increase in crystallisation rate obtained from the products derived from the present invention is not observed.

The two types of compound may each be added to separate batches of polyamide during the polymerisation of the polyamide and these batches may subsequently be melt blended to give a product having the advantages conferred by the present invention but it is preferred that the metal compound is not introduced during a polymerisation stage because such materials can cause chain transfer with the result that low molecular weight polyamides are produced. For this reason it is preferred that the metal compound is blended with polyamide after the polymerisation of the polyamide. On the other hand the organo-phosphonic acids may generally be added to the polymerisation reactants without adverse effect and this is a preferred method of blending the organo-phosphonic acid with the polyamide.

A convenient method of intimately blending the components together is by a matsterbatch technique in which one or more of one type of the combination of additive materials is first incorporated at a relatively high concentration into the polyamide and the resulting material is then compounded with further polyamide containing one or more of the other type of the combination to give the required concentration of ingredients in the final compound. Additional polyamide not containing either type of additive may be included to adjust concentrations to a desired level. Processes in which the additives of the combination are separately dispersed in batches of polyamides before melt blending together are preferred because these processes have been found to give rise to a greater increase in crystallisation rate for a given concentration of additives than processes which produce blends containing the same concentration of additives but in which one additive of the combination is added directly to a polyamide containing the other additive or in which both additives are dry blended together before addition to a molten polyamide. Similarly, the masterbatch technique of blending polymers already containing the additives permits the use of lower concentrations of additives than in the techniques in which the additives are not first introduced into separate batches of the polyamide.

The addition of preformed metal salts of the organo-phosphonic acids specified to a molten polyamide does not give a composition having the improved crystallisation behavior of products produced by the present invention.

Polyamides in which the present invention may be usefully employed include those derived from lactams or omega-amino carboxylic acids, such as poly-epsilon-caprolactam or polyaminoundecanoic acid or from the salts of diamines and dicarboxylic acids such as polyhexamethylene adipamide. The polyamides may, in addition to the combination of nucleating additives of the present invention, also contain the usual additives such as delustrants, brightening agents, stabilisers against the action of heat and light, fillers or dyestuffs. When required for non-fibre application, for example, the polyamide may also contain toughening agents, for example ethylene-vinyl acetate copolymers. In particular, the polyamide may contain a reinforcing agent—for example glass fibres, glass ballotini or mica. These additives may be present in an amount from 5% up to about 60% by weight of the polymer. Flame retardant agents may also be present, for example, those disclosed in our British Pat. No. 1,208,865.

Suitable organo-phosphonic acids include both cycloaliphatic and aromatic (including aralkyl) phosphonic acids or corresponding derivatives thereof, for example, halides and esters derived from the acids. Under the severe reaction conditions involved during the melt blending processes such derivatives react with the metal compounds to give the same effect as the free acids. Preferred compounds are cyclohexyl, phenyl and benzyl phosphonic acids or derivatives such as phenyl phosphonic dichloride and dimethyl phenyl phosphonate. Their concentration should preferably be such as to give 0.15 mole of phosphorus per $10^6$ g of the resulting composition although concentrations as low as 0.025 mole of phosphorus per $10^6$ g show a significant nucleating effect. Concentrations above 120 mole phosphorus per $10^6$ g are impractical. The most preferred concentration rate is 0.3-20 mole phosphorus per $10^6$ g.

The metal salts of saturated or unsaturated carboxylic acids, metal oxides and hydroxides include those of the metals of groups 1a,1b, 2a, 2b, 3b and 7a of the Periodic Table (as tabulated on page 30 of Advanced Inorganic Chemistry by Cotton and Wilkinson published in 1962 by Interscience Publishers) such as aluminium, zinc, magnesium, calcium, barium, cadmium manganese, lithium and sodium. The metals of group 8 of the Periodic Table, e.g. cobalt and nickel, are also suitable but give rise to undesirably coloured products. The carboxylic acids include acetic, stearic and oleic acids.

It is advantageous to employ salts having a low melting temperature, viz below the processing temperature of the polyamide.

The molar concentration range of metals is similar to that for phosphorus as defined above.

It is known from British Pat. No. 928,286 to use zinc salts of saturated or unsaturated fatty acids together with an inorganic oxy-acid phosphorus or a salt thereof for the purpose of stabilising the melt viscosity of polyamides. However, such combinations do not have the nucleating activity in polyamides as do the combinations of the present invention using organo-phosphorus acids.

The compositions of the present invention are also suitable for melt extrusion by conventional techniques to form films which crystallise at higher temperatures than would films derived from unnucleated polyamide. The high efficiency of the present systems, permits a useful effect to be obtained using low concentrations of additives. This is particularly useful in films for food applications where the presence of additives should be kept to a minimum.

The rate of crystallisation and thus the efficiency of nucleation, are conveniently assessed by a DSC technique: molten polymer is cooled at constant rate and in certain temperature range the crystallisation is observed as an exotherm. The onset of the crystallisation peak ($T_c$) and the crystallisation peak temperature ($T_p$) are related to the crystallisation rate. The values $T_c$ and $T_p$ depend upon melting conditions and also upon cooling rate $q_c$. The melting temperature (Tm) of the polymer may also be observed from the heating cycle.

The results given in the examples were obtained by using Perkin elmer DSC 1B apparatus, for 66 nylon the conditions were as follows: heating rate 16° C./min, holding 3 mins at 300° C., cooling rate $q_c$ of either 16° C. or 64° C./min, weight of sample was 8 mg.

It is preferred that the polyamide compositions resulting from the method of the invention should show a crystallisation peak temperature, measured under these conditions using a cooling rate of 16° C./min of at least 2° C. greater than the polyamide not treated by the method of the invention.

The invention will now be further described by reference to the following illustrative and comparative examples.

EXAMPLE 1

Granules of 66 nylon polymer having a relative viscosity of 44 (measured at 25° C. in a solution containing 5.5 g polymer in 50 mls of 90% formic acid) and containing 0.15% w/w $TiO_2$ and 0.25% w/w cyclohexyl phosphonic acid (15.2 μmole P/g) were coated with measured quantities of zinc stearate or zinc acetate and the mixtures were passed through a horizontal screw extruder at a temperature 285°–290° C. The extruded lace of circular cross-section was quenched in a bath of cold water and cut into cylindrical granules. The granules were dried in vacuum at 90°–100° C. for 16 hours and the crystallisation behaviour was examined as described above. The results shown in Table 1 indicate that the temperatures for onset of crystallisation and the peak crystallisation temperatures are increased in the presence of the combination of the zinc salts and the cyclohexyl phosphonic acid showing that crystallisation both begin and are completed earlier in the cooling cycle than in the control run.

TABLE 1

| Additive | Zn μ mole/g | $T_m$(peak) °C. | $T_c$ °C. $q_c =$ 16° C./min | $T_p$ °C. $q_c =$ 16° C./min | $T_c$ °C. $q_c =$ 64° C./min | $T_p$ °C. $q_c =$ 64° C./min |
|---|---|---|---|---|---|---|
| None | 0 | 265 | 235 | 228 | 218 | 205 |
| Zn-stearate 0.23% | 3.6 | 265 | 243 | 231 | 229 | 212 |
| Zn-stearate 0.50% | 7.9 | 265 | 246 | 236 | 232 | 217 |
| Zn-stearate 1.0% | 15.8 | 265 | 248 | 237 | 234 | 218 |
| $(CH_3COO)_2$ Zn $2H_2O$,0.35% | 15.8 | 265 | 247 | 239 | 235 | 218 |

As further control experiments the crystallisation behaviour of the polymer (relative viscosity 44) without additives and containing 0.3% by weight of zinc stearate (4.7 μmole/g) was examined. The results are shown in the table below:

TABLE 2

| Sample | Zn μ mole/g | $T_m$ (peak) °C. | $T_c$ °C. $q_c =$ 16° C./min | $T_p$ °C. $q_c =$ 16° C./min | $T_c$ °C. $q_c =$ 64° C./min | $T_p$ °C. $q_c =$ 64° C./min |
|---|---|---|---|---|---|---|
| Nylon 66 only | 0 | 265° | 232 | 226 | 218 | 206 |
| Nylon | | | | | | |

TABLE 2-continued

| Sample | Zn μ mole/g | $T_m$ (peak) °C. | $T_c$ °C. $q_c = 16°$ C./min | $T_p$ °C. $q_c = 16°$ C./min | $T_c$ °C. $q_c = 64°$ C./min | $T_p$ °C. $q_c = 64°$ C./min |
|---|---|---|---|---|---|---|
| 66 + Zn stearate (0.3%) | 4.7 | 265° | 232 | 225 | 217 | 205 |

The results indicate that neither additive of the combination is effective alone in influencing the crystallisation behaviour of the polyamide.

EXAMPLE 2

Granules of three 66 nylon polymers, A, B and C, containing A—0.15% w/w $TiO_2$, 0.25% w/w cyclohexyl phosphonic acid (15.2 μmole P/g), B—0.2% w/w ethylene-bis-stearamide, 0.3% w/w zinc stearate (4.7 μmole zinc/g) and C—no additives and having relative viscosities 44, 40 and 42, respectively, were tumble blended and the mixtures were processed as described in Example 1. The crystallisation behaviour of the products was examined; results are given in Table 3.

TABLE 3

| Composition, wt % | | | P μ mole/g | Zn μ mole/g | $T_m$(peak) °C. | $T_c$ °C. $q_c = 16°$/min | $T_p$ °C. $q_c = 16°$/min | $T_c$ °C. $q_c = 64°$/min | $T_p$ °C. $q_c = 64°$/min |
|---|---|---|---|---|---|---|---|---|---|
| A | B | C | | | | | | | |
| 0 | 76.4 | 23.6 | 0 | 3.6 | 265 | 232 | 226 | 217 | 205 |
| 11.8 | 38.3 | 49.9 | 1.8 | 1.8 | 265 | 243 | 232 | 232 | 214 |
| 23.6 | 76.4 | 0 | 3.6 | 3.6 | 264 | 245 | 234 | 235 | 217 |
| 100.0 | 0 | 0 | 15.2 | 0 | 264 | 234 | 226 | 218 | 207 |

EXAMPLE 3

A range of metal acetates was added to 66 nylon polymer having a relative viscosity 57 containing 0.20% w/w cyclohexyl phosphonic acid (12 μmole P/g) by melt blending at 295° C. for 15 mins. The crystallisation behaviour of the product was studied using a cooling rate of 64° C./min. Details are shown in Table 4. The acetates were added in proportions to give 24μ equiv. m/g where m=metal.

TABLE 4

| Metal | | $T_m$(Peak) | $T_c$ °C. | $T_p$ °C. |
|---|---|---|---|---|
| Copper | ($Cu^{++}$) | 259/263 | 219 | 204 |
| Magnesium | ($Mg^{++}$) | 265 | 233 | 216 |
| Calcium | ($Ca^{++}$) | 263 | 233 | 217 |
| Barium | ($Ba^{++}$) | 263 | 223 | 209 |
| Zinc | ($Zn^{++}$) | 266 | 227 | 209 |
| Cadmium | ($Cd^{++}$) | 264 | 230 | 213 |
| Manganese | ($Mn^{++}$) | 264 | 232 | 216 |
| Cobalt | ($Co^{++}$) | 262 | 229 | 211 |
| Nickel | ($Ni^{++}$) | 258 | 220 | 209 |
| Control | (No metal) | 260 | 207 | 192 |

EXAMPLE 4

Example 1 was repeated using metal stearate and a 66 nylon polymer containing 0.20% phenyl phosphonic acid (12 μmole P/g). Details are given in Table 5.

TABLE 5

| Metals μ equiv/g | RV | $T_m$ (peak) °C. | $T_c$ °C. $q_c = 16°$/min | $T_p$ °C. $q_c = 16°$/min | $T_c$ °C. $q_c = 64°$/min | $T_p$ °C. $q_c = 64°$/min |
|---|---|---|---|---|---|---|
| Mg stearate 0.42% | 14 | 63.8 | 265 | 241 | 230 | 228 | 210 |
| Ca stearate | 14 | 59.7 | 266 | 234 | 227 | 220 | 209 |
| 0.44% Al stearate 0.42% ZnO 0.10% + Zinc stearate 0.30% | 14 | 53.2 | 264 | 240 | 229 | 228 | 212 |
| + ethylene-b-stearamide 0.20% | 34 | 51.4 | 264 | 243 | 231 | 230 | 213 |

EXAMPLE 5

0.32 parts by weight of magnesium acetate tetrahydrate were dehydrated by heating it for 2 hours at 130°–140° C. under atmospheric pressure and the resultant powder tumble blended with 100 parts by weight of dry 66 nylon granulate containing 0.15% w/w $TiO_2$ and 0.25% w/w cyclohexyl phosphonic acid and having a relative viscosity of 44. The mixture was processed as described in Example 1. Crystallisation behaviour of the product was compared with that of original polymer. Results are given in Table 6.

TABLE 6

| Material | $T_m$(peak) °C. | $T_c$ °C. $q_c = 16°$/min | $T_p$ °C. $q_c = 16°$/min | $T_c$ °C. $q_c = 64°$/min | $T_p$ °C. $q_c = 64°$/min |
|---|---|---|---|---|---|
| Original polymer | 264 | 231 | 224 | 215 | 204 |
| Nucleated composition | 264 | 247 | 237 | 234 | 219 |

The original polymer, the nucleated composition and also additive-free control 66 nylon polymer (relative viscosity 43) were spun on a single end machine to 13-filament yarn at a spinning speed 1127 meters per minute.

Extensibility of spun yarns was tested using an Instron tensometer (deformation rate 1000%/min). Results are given in Table 7. The undrawn yarn prepared from the nucleated polymer also exhibited X-ray reflection patterns typical for undrawn yarns prepared from nucleated 66 nylon as described in British Pat. No. 1,211,685.

Spun yarns were drawn to draw ratios specified in Table 7. Extensibility of drawn yards was measured using an Instron tensometer, deformation rate 100%/min. Productivity ratio PR was calculated using the following formula $$PR = \frac{DR^s (\epsilon_B^s + 100)}{DR^c (\epsilon_B^c + 100)}$$

where DR is draw ratio and $\epsilon_B$ is extensibility (%); superscript s indicates values obtained with experimental yarns, superscript c indicates values obtained with additive-free control yarn. Values given in Table 7 demonstrate that substantial increase in PR is observed in the case when the combination of cyclohexyl phosphonic acid and magnesium salt is present in the polymer used for spinning.

TABLE 7

| Polymer | Spun Yarns | | | Drawn Yarns | | |
|---|---|---|---|---|---|---|
| | dtex | Ext. % | Draw ratio | dtex | Ext. % | PR |
| Additive-free control | 121 | 255 | 2.91 | 43 | 27.4 | — |
| Original polymer | 120 | 297 | 2.91 | 44 | 41.0 | 1.11 |
| | | | 3.17 | 40 | 28.5 | 1.10 |
| Nucleated composition | 120 | 423 | 2.91 | 44 | 75.3 | 1.30 |
| | | | 3.93 | 32 | 33.1 | 1.41 |

EXAMPLE 6

The following experiment demonstrates the improvement in crystallinity behaviour obtained when the components forming an active nucleant are brought together in a medium of high viscosity, namely in a molten polyamide, compared with the behaviour when the components are combined at the polymer making stage when the reactants are still in solution.

Polymer A—7000 g of 66 salt, 3000 g of water and 5.18 g of magnesium acetate tetrahydrate were charged into a 16 liter autoclave and subjected to normal 66 nylon manufacturing process; during the polymerisation and whilst the reactants were still in solution a solution of cyclohexyl phosphonic acid (3.9 g in 300 mls of water) was added. Prepared polymer was discharged, dried and its crystallisation behaviour was examined. Results are given in Table 8.

Polymer B—0.16 parts by weight of magnesium acetate tetrahydrate were dehydrated by heating it for 2 hours at 130°–140° C. under atmospheric pressure and the resulted powder was blended with 100 parts by weight of dry 66 nylon granulate (containing 3.6 μmole cyclohexyl phosphonic acid per gram and having relative viscosity of 57). The mixture was processed as described in Example 1 and the product was tested. The results are quoted in Table 8.

TABLE 8

| Polymer | Relative viscosity | P μ mole/g | Mg μ mole/g | $T_m$(peak) | $T_c$ $q_c = 64°/min$ | $T_p$ |
|---|---|---|---|---|---|---|
| A | 38 | 4.0 | 4.0 | 263 | 220 | 207 |
| B | 50 | 3.6 | 3.7 | 264 | 231 | 216 |

EXAMPLE 7

Granules of 6.9 nylon polymer containing respectively (a) no additive, (b) 12.2 μmole P/g cyclohexyl phosphonic acid (added to salt solution prior to polymerisation), (c) material (b) coated with magnesium acetate to give 12.2 μmole M/g was extruded as described in Example 1 and the crystallisation behaviour examined as previously described. Relative viscosities of polymers and the crystallisation behaviour at a cooling rate of 64°/min are given in Table 9.

TABLE 9

| Material | Relative Viscosity | $T_c$°C. | $T_p$°C. |
|---|---|---|---|
| (a) | 61.5 | 163 | 154 |
| (b) | 80.3 | 164 | 153 |
| (c) | 74.4 | 171 | 161 |

EXAMPLE 8

Granules of nylon 6 (having a relative viscosity of 40) and a copolymer of nylon 66/6 (97/3 weight percent, relative viscosity 45) containing cyclohexyl phosphonic acid and zinc stearate in quantities to give 12.2 μmole/g phosphorus and 7.9 μmole/g zinc were extruded and the crystallisation behaviour of the polymers determined at a cooling rate of 16° C./min. The results are given in Table 10 compared with control samples not containing the zinc stearate or phosphonic acid.

TABLE 10

| Polymer | $T_c$°C. | $T_p$°C. |
|---|---|---|
| Nylon 6 | 207 | 191 |
| Nulon 6 control | 191 | 182 |
| Nylon 66/6 | 240 | 230 |
| Nylon 66/6 control | 231 | 220 |

EXAMPLE 9

Granules of 66 nylon polymer containing 0.15% by weight $TiO_2$ and 0.25% by weight cyclohexyl phosphonic acid (15.2 μmole P/g) were tumble blended with zinc stearate, ethylene-bis-stearamide and 66 nylon to give a series of compositions of varying cyclohexyl phosphonic acid content, each containing 0.5% by weight zinc stearate and 0.2% by weight ethylene bis-stearamide. These mixtures were extrusion compounded to give granular products. The fast cycling properties of each of these products were studied using a Stübbe SKM1-S injection moulded machine fitted with a single-impression mould. The times required to cool the mould to a temperature at which the moulded article could be removed from the mould without distortion of the moulding occurring was measured for each product. In all cases a constant injection time (time allowed for filling the mould) of 1.2 seconds was used. The cooling times are recorded below together with details of the crystallisation behaviour and mechanical properties of some of the blends.

TABLE 11

| P μ mole/g | Cooling Time seconds | $T_c$(°C.) $q_c = 16°$ C./min | $T_p$(°C.) | Tensile Strength (MN/m²) | Flexural Modulus GN/m² |
|---|---|---|---|---|---|
| 15 | 0.6 | 248 | 238 | 94 | 2.85 |
| 3.75 | 0.6 | — | — | — | — |
| 2.25 | 0.6 | — | — | — | — |
| 1.5 | 0.6 | — | — | — | — |
| 0.75 | 0.6 | — | — | 94 | 2.78 |
| 0.15 | 0.6 | — | — | — | — |
| 0.075 | 0.8 | 241.5 | 232.5 | — | — |
| 0.037 | 2.5 | 237.5 | 230.5 | 94 | 2.79 |
| 0.015 | 5.0 | — | — | — | — |
| 0 | 5.0 | 235 | 228 | 82 | 2.5 |

The control material differed from the above products in that it contained no cyclohexyl phosphonic acid and 0.3% by weight of zinc stearate.

EXAMPLE 10

The procedure of Example 9 was repeated to give granular products containing varying levels of zinc stearate, each containing 2.25 μmole phosphorus/g in the form of cyclohexyl phosphonic acid and 0.2% ethylene-bis-stearamide. The fast cycling properties were evaluated using the procedure and the control sample used in Example 9 and the results obtained are recorded in Table 12.

TABLE 12

| Zinc Stearate (% by weight) | Zinc (μ mole/g) | Cooling Time (secs) |
|---|---|---|
| 1 | 16 | 0.6 |
| 0.5 | 8 | 0.6 |
| 0.1 | 1.6 | 0.6 |
| 0.01 | 0.16 | 0.8 |
| 0 | | 5.0 |

EXAMPLE 11

The procedure of Example 9 was used to evaluate a series of different metal salts. Granular products were prepared containing 2.25 μmole phosphorus/g (as cyclohexyl phosphonic acid), 0.2% by weight of ethylene bis-stearamide and 8μ equiv. m/g (where m is the metal) using the salts listed in Table 13.

TABLE 13

| Additive | Cooling Time (seconds) |
|---|---|
| Lithium stearate | 0.8–1.0 |
| Sodium stearate | 1.0 |
| Calcium stearate | 0.6 |
| Magnesium stearate | 0.6 |
| Aluminium stearate | 1.0 |
| Lead stearate | 0.8–1.0 |
| Zinc stearate | 0.6 |
| Zinc oxide | 0.6 |
| Control | 5.0 |

The control was that used in Example 9.

EXAMPLE 12

Samples of nylon 66 (relative viscosity 45) were tumble blended with 0.5% by weight (7.9 μmole/g) of zinc stearate and 0.1% by weight of phenyl phosphonic acid, phenyl phosphonic dichloride and dimethyl phenyl phosphonate respectively. The three samples were extrusion compounded in a screw extruder under melt conditions at a temperature of 285°–290° C. The crystallisation behaviour of the products, determined as previously described, are recorded in Table 14.

TABLE 14

| Phosphorus compound | P μ mole/g | $T_c$ (°C.) $q_c = 16°$ C./min | $T_p$ (°C.) |
|---|---|---|---|
| phenyl phosphonic acid | 6 | 243.5 | 234 |
| phenyl phosphonic dichloride | 5 | 244.5 | 234.5 |
| dimethyl phenyl phosphonate | 5 | 244 | 233.5 |
| Control (no additives) | 0 | 235 | 227 |

EXAMPLE 13

Nylon 6 containing 0.25% by weight of cyclohexyl phosphonic acid was extrusion compounded in various proportions with batches of the same nylon 6 containing 0.5% by weight of zinc stearate to give blends containing the concentration of ingredients listed below.

Similar compositions were prepared by direct addition of various quantities of cyclohexyl phosphonic acid to the stearate-containing polymer followed by tumble blending and extrusion under melt conditions. Table 15 shows the crystallisation behaviour and mechanical properties of the resultant products.

TABLE 15

| P μ mole/g | $T_c$ (°C.) $q_c = 16°$ C./min | $T_p$ (°C.) | Tensile Strength MN/m² | Elongation to break (%) | Flexural Modulus GN/m² | Impact Strength (kJ/m²) |
|---|---|---|---|---|---|---|
| 0.75* | 183 | 166 | 85 | 12 | 2.31 | 27 |
| 0.3* | 181 | 166 | 87 | 12 | 2.38 | 25 |
| 3+ | 183 | 166 | 86 | 12 | 2.39 | 27 |
| 1.8+ | 181 | 166 | 85 | 12 | 2.38 | 28 |
| 0.6+ | 179 | 165 | 85 | 12 | 2.38 | 26 |
| Control≠ | 170 | 159 | 72 | 36 | 2.10 | 41 |

*present in nylon masterbatch
+added direct to nylon by dry tumble blending
≠containing only zinc stearate, no phosphorus

EXAMPLE 14

A nylon 66: nylon 6 copolymer containing the comonomers in the weight ratio 80:20 was extrusion compounded with 0.5% zinc stearate and 0.2% ethylene bis-stearamide. A sample of this material was tumble blended with 0.2% by weight of cyclohexylphosphonic acid (12 μ mole/g) and the mixture was extrusion compounded. Table 16 shows the effect on the crystallisation and mechanical properties of the original blend of introducing the phosphonic acid.

TABLE 16

| P μ mole/g | $T_c$(°C.) $q_c = 16°$ C./min | $T_p$(°C.) | Tensile Strength MN/m² | Elongation to break (%) | Flexural Modulus GN/m² | Impact Strength (kJ/m²) |
|---|---|---|---|---|---|---|
| 0 | 198 | 189 | 68 | 100 | 1.67 | 29 |
| 12 | 213.5 | 198 | 76 | 22 | 1.97 | 22 |

EXAMPLE 15

Granules of nylon 66 (relative viscosity 45) containing 0.1% by weight of benzyl phosphonic acid was dry tumbled with 0.5% by weight of zinc stearate. The mixture was extrusion compounded at a temperature of 285°–290° C. as described in Example 1. The product was vacuum dried at 90°–100° C. for 16 hours and the crystallisation properties of the composition were examined as described above. Values of $T_c$ and $T_p$ (measured at a cooling rate of 16° C./min) of 245.5° C. and 234.5° C. respectively were obtained. These compare with values of 235° and 228° C. for the control polyamide not containing the combination of metal salt and benzyl phosphonic acid.

We claim:

1. A method of producing an aliphatic polycarbonamide composition comprising intimately blending an organophosphonic acid of general formula

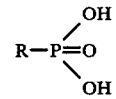

where R is an inert organic radical and a metal compound selected from the group consisting of metal salts of staturated or unsaturated carboxylic acids, metal oxides or hydroxides, with a polyamide under melt conditions, wherein the metal is selected from the group consisting of metals of groups 2A, 2B, 3B, 7A and 8 of the Periodic Table of Elements, as tabulated on page 30 of Advanced Inorganic Chemistry by Cotton and Wilkinson published in 1962 by Interscience Publishers, the concentration of organophosphonic acid is such as to give between 0.025 mole and 120 mole of phosphorus per $10^6$ gram of the polycarbonamide composition and the concentration of metal compound present is such as to give between 0.025 mole and 120 mole of metal per $10^6$ gram of the polycarbonamide composition.

2. A method according to claim 1 in which either the metal compound or the organophosphorus compound is intimately dispersed in said polycarbonamide prior to the addition of whichever compound is not present in said polycarbonamide.

3. A method according to claim 1 in which both the metal compound and the organophosphorus compound are each intimately dispersed in separate batches of said polycarbonamide before melt blending the batches of said polycarbonamide.

4. A method according to claim 1 in which R is selected from the group consisting of cycloaliphatic and aromatic radicals.

5. A method according to claim 1 in which R is selected from the group consisting of phenyl, benzyl and cyclohexyl radicals.

6. A method according to claim 1 in which the concentration of phosphorus is between 0.15 mole and 20 mole per $10^6$ gram of polyamide composition.

7. A method according to claim 1 in which the concentration of metal is between 0.15 mole and 20 mole per $10^6$ gram of polyamide composition.

8. A method according to claim 1 in which the metal compound is selected from the group consisting of salts of acetic, stearic and oleic acids.

9. A method according to claim 1 in which the polyamide is polycaproamide, polyhexamethylene adipamide or poly(caproamide/hexamethylene adipamide).

10. A method according to claim 1 in which at least one of a delustrant, brightening agent, stabiliser, filler or toughening agent is intimately blended into the polyamide composition.

11. An aliphatic polycarbonamide composition consisting essentially of a nucleating quantity of a nucleant derived by intimately blending an organophosphonic acid of general formula

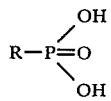

where R is an inert organic radical and a metal compound selected from the group consisting of metal salts of saturated or unsaturated carboxylic acids, metal oxides or hydroxides in the presence of molten said polycarbonamide, the resulting composition having a crystallisation peak temperature measured at a cooling rate of 16° C./min of at least 2° C. higher than the polyamide in the absence of the nucleant wherein the metal is selected from the group consisting of metals of the groups 2A, 2B, 3B, 7A and 8 of the Periodic Table of Elements, as tabulated on page 30 of Advanced Inorganic Chemistry by Cotton and Wilkinson, published in 1962 by Interscience Publishers, the concentration of organophosphonic acid is such as to give between 0.025 mole and 120 mole of phosphorus per $10^6$ gram of polycarbonamide composition and the concentration of metal compound present is such as to give between 0.025 mole and 120 mole of metal per $10^6$ gram of the polycarbonamide composition.

12. A method of producing a polyhexamethylene adipamide composition comprising intimately blending an organophosphonic acid of general formula

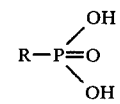

where R is an inert organic radical and a metal compound selected from the group consisting of metal salts of saturated or unsaturated carboxylic acids, metal oxides or hydroxides, with polyhexamethylene adipamide under melt conditions, wherein the metal is selected from the group consisting of metals of groups 2a, 2b, 3b, 7a and 8 of the Periodic Table of Elements, as tabulated on page 30 of Advanced Inorganic Chemistry by Cotton and Wilkinson published in 1962 by Interscience Publishers, the concentration of organophosphonic acid is such as to give between 0.025 mole and 120 mole of phosphorus per $10^6$ gram of the composition and the concentration of metal compound present is such as to give between 0.025 mole and 120 mole of metal per $10^6$ gram of the composition.

13. A method according to claim 12 in which either the metal compound or the organophosphorus compound is intimately dispersed in said polyhexamethylene adipamide prior to the addition of whichever compound is not present in the polyamide.

14. A method according to claim 12 in which both the metal compound and the organophosphorus compound are each intimately dispersed in separate batches of the said polyhexamethylene adipamide before melt blending the batches of said polyhexamethylene adipamide.

15. A method according to claim 12 in which R is selected from the group consisting of cycloaliphatic and aromatic radicals.

16. A method according to claim 12 in which R is selected from the group consisting of phenyl, benzyl and cyclohexyl radicals.

17. A method according to claim 12 in which the concentration of phosphorus is between 0.15 mole and 20 mole per $10^6$ gram of composition.

18. A method according to claim 12 in which the concentration of metal is between 0.15 mole and 20 mole per $10^6$ gram of composition.

19. A method according to claim 12 in which the metal compound is selected from the group consisting of salts of acetic, stearic and oleic acids.

20. A method according to claim 12 in which at least one of a delustrant, brightening agent, stabiliser, filler or toughening agent is intimately blended into the said polyhexamethylene adipamide composition.

21. A polyhexamethylene adipamide composition consisting essentially of a nucleating quantity of a nucleant derived by intimately blending an organophosphonic acid of general formula

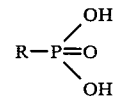

where R is an inert organic radical and a metal compound selected from the group consisting of metal salts of saturated or unsaturated carboxylic acids, metal oxides or hydroxides in the presence of molten said polyhexamethylene adipamide, wherein the metal is selected from the group consisting of metals of groups 2a, 2b, 3b, 7a and 8 of the Periodic Table of Elements, as tabulated on page 30 of Advanced Inorganic Chemistry by Cotton and Wilkinson published by 1962 by Interscience Publishers, the resulting composition having a crystallisation peak temperature measured at a cooling rate of 16° C./min of at least 2° C. higher then the said polyhexamethylene adipamide in the absence of the nucleant the concentration of organophosphonic acid is such as to give between 0.025 mole and 120 mole of phosphorus per $10^6$ gram of the composition and the concentration of metal compound present is such as to give between 0.025 mole and 120 mole of metal per $10^6$ gram of the composition.

* * * * *